United States Patent Office 3,539,674
Patented Nov. 10, 1970

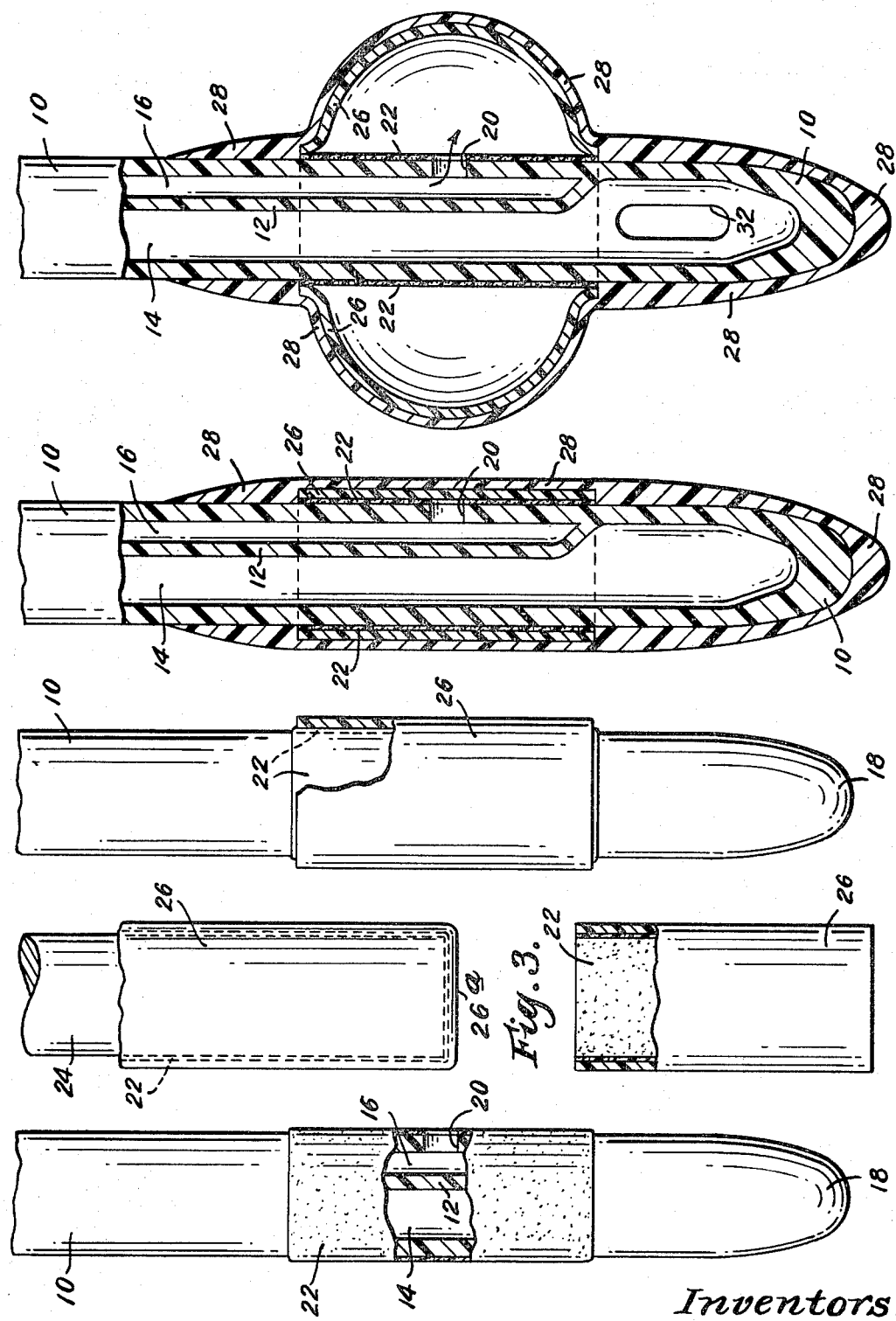

3,539,674
METHOD OF MANUFACTURING A PLASTIC CATHETER
Paul Dereniuk, Woonsocket, and Walter J. Blecharczyk, East Providence, R.I., assignors to Davol Inc., Providence, R.I., a corporation of Rhode Island
Filed July 22, 1968, Ser. No. 746,356
Int. Cl. B29d 9/10; B29c 13/00
U.S. Cl. 264—130
6 Claims

ABSTRACT OF THE DISCLOSURE

In the manufacture of plastic catheters for urethral retention, a plastic catheter shaft is coated with a release agent, and a plastic sac sleeve surrounds the release agent and catheter shaft. The shaft and sleeve are then dipped into a plastic solution to form a skin which adheres to the sleeve and the shaft, but the release agent causes the inner surface of the sleeve to remain separate from the shaft. The choice of materials and proportions for the dipping solution is such as to allow the plastic overdip to unite the skin with the sleeve and shaft, but prevents the solvent from penetrating the sleeve, which would undesirably attach the inner surface of the sleeve to the catheter shaft despite the present of the release agent.

BACKGROUND OF THE INVENTION

This invention relates to urethral catheters having an inflatable retention balloon, and particularly concerns a method for manufacturing catheters of this type entirely from plastic materials.

THE PRIOR ART

Catheters of the urethral retention type have been in use for many years. These usually comprise a flexible shaft having elongated drainage and inflating lumens extending longitudinally therethrough. An inflation eye in the catheter wall extends into communication with the inflating lumen, and an inflatable sac or balloon is secured to the catheter in overlying relationship to the inflating eye so that introduction of fluid pressure through the inflating lumen will cause the balloon to distend for urethral retention. The distal end of the catheter is normally closed off and rounded, and a drainage eye is provided through the catheter wall in communication with the drainage lumen, the eye being located between the balloon and the distal end of the catheter. Catheters of this general type are illustrated in U.S. Pats. Nos. 2,248,934 and 2,308,484.

Catheters of the general type just described have been conventionally made of rubber, the usual manufacturing technique involving a series of latex dips, much in the manner described in U.S. Pat. No. 2,320,157, for example. Although rubber catheters of this type have given quite satisfactory service, it has been found that certain advantages are achieved by fabricating such catheters of a clear plastic material. More specifically, in urethral catheters fabricated of rubber, it has been found that after a certain period of usage there is a build-up of calcium salts in the drainage lumen of the catheter, which reduces the drainage capacity thereof, and in extreme cases might even occlude the catheter so as to prevent drainage completely. Catheters fabricated of a non-traumatic flexible, non-toxic plastic material function substantially as effectively as the conventional rubber catheter, but resist the build-up of calcium salts. This permits a smaller drainage lumen to be used, and in turn results in a catheter shaft of smaller outside diameter, which contributes to the comfort of the patient. In addition, when a catheter of clear plastic is used, the device can be visually inspected during use to insure that proper drainage is taking place.

SUMMARY AND OBJECTS OF THE INVENTION

Since it is not possible to manufacture a plastic catheter by means of the same techniques used to manufacture rubber catheters, it is a primary object of the present invention to provide a method of manufacturing plastic urethral retention catheters.

One of the principal problems in the manufacture of plastic catheters is the provision of suitable means for securing the inflatable plastic sac or balloon to the catheter shaft so that the balloon is securely sealed to the shaft at either end, while at the same time its mid-section is free to distend when inflated. In addition, the outer surface of the catheter shaft and sac assembly must be substantially smooth and unobstructed to facilitate initial insertion of the catheter at the time of use. Accordingly, a specific object of the present invention is to provide a technique for securing an inflatable plastic sac to a catheter shaft, in a manner which solves the foregoing problems.

A further object of the invention is the provision of a method for securing an inflatable plastic sac to a catheter, which is relatively simple and economical to employ and which results in an effective end product.

Previously, a number of different production methods have been tried for attaching a plastic sac to a plastic catheter shaft. In one of these methods an aqueous water soluble partition material was coated on the catheter shaft in the neighborhood of the inflation eye. Then, the sac was formed by overdipping, i.e., immersing the tip of the catheter shaft and the partition in a plastic solution so that a film of liquid adheres to the catheter shaft and later dries to form a plastic coating thereon. The coating ultimately formed will adhere to the catheter shaft above and below the partition but will be separable from the catheter shaft for inflation purposes in the neighborhood of the partition, it being the function of the aqueous partition material to prevent the overdipped coating from adhering to the catheter shaft in this region. A disadvantage of this method is that the quality of the inflation sac thus formed could not be pre-tested at the factory by air inflation. Instead, the balloon was not inflated until the time for use arrived, at which time it had to be inflated with water so as to dissolve the aqueous partition material, thereby permitting inflation of the sac.

Another method employed in the past was to make a preformed plastic sac sleeve, coat the catheter shaft with a release agent, put the sleeve over the coated portion of the catheter shaft, and heat-seal the ends of the sleeve to the shaft. The present invention aims at securing such a sleeve to the catheter shaft without the use of heat-sealing equipment, which is expensive and generates a certain amount of radio frequency interference.

Still another method previously used was to put a preformed plastic sac sleeve in place over the bare catheter shaft, and then use the overdipping method to form a film of plastic solution which would dry to a plastic coating over the shaft and the sleeve. The present invention is an improvement upon the last mentioned approach, in that it provides a number of features designed to achieve more reliable separation of the plastic sleeve from the catheter shaft.

More particularly, the present method combines the advantages of the release agent approach, with its positive separation of sleeve and shaft, with the advantages of the overdipping approach which is the simplest and most economical way to secure the sleeve to the shaft. The necessity for expensive and interference-generating heat-sealing equipment, as well as the need for subsequently dissolving an aqueous partition material, are completely avoided by the present method.

This invention contemplates a manufacturing method which involves forming a cylindrical sac sleeve of plastic material, surrounding the plastic catheter shaft and inflation eye with a release agent coating and with the preformed sleeve, and securing the ends of the sleeve to the shaft by dipping the shaft and sleeve into a plastic solution which is adapted to form a film thereover and then drying or curing to form a skin which adheres to the sleeve and to that portion of the shaft which is beyond the ends of the sleeve. The release agent coating is a material which prevents the sleeve from adhering to the shaft between the sleeve ends, so that the sleeve and the skin together form a balloon which is separable from the shaft in the neighborhood of the inflation eye, so that the balloon can be inflated when a fluid is forced into it.

The sleeve itself may be formed by the steps of coating a mandrel with a release agent, and dipping the coated portion of the mandrel into a solution of a plastic material which forms a film that surrounds and adheres to the coated portion of the mandrel and dries thereon to form the sleeve. Subsequently, the sleeve is removed from the mandrel. The release agent coated on the mandrel will normally be transferred to the interior of the pre-formed sleeve upon removal from the mandrel, and may even constitute the same release agent coating which later serves to separate the sleeve from the catheter shaft.

In the practice of the present method, the plastic solution into which the sleeve and catheter are dipped must be carefully controlled as to its composition, otherwise it has been found that the solvent material will penetrate the pre-formed plastic sleeve and cause sticking of the sleeve to the catheter shaft notwithstanding the presence of the release agent. When this happens, proper inflation of the balloon is obviously prevented. Accordingly, it has been found that the solution of plastic material employed for the overdipping step should consist of from about 20% to about 35% by weight of non-solvent diluent to prevent the solvent material therein from excessively attacking the sleeve.

Additional objects, features and advantages of the invention will become apparent from the following detailed description of a preferred and illustrative embodiment.

DESCRIPTION OF THE DRAWING

In the drawing which illustrates the best mode presently contemplated for carrying out the present invention:

FIG. 1 is an elevational view, with parts broken away and sectioned for clarity of illustration, of a plastic catheter shaft before the inflation sac or the drainage eye of the finished catheter have been formed. The shaft is shown with an optional release agent coating thereon;

FIG. 2 is an elevational view of a mandrel upon which a plastic cup has been formed;

FIG. 3 is an elevational view with parts broken away and sectioned of the plastic cup of FIG. 2 after it has been removed from the mandrel and trimmed to form a cylindrical sleeve;

FIG. 4 is an elevational view, with parts broken away and sectioned, of the plastic sleeve of FIG. 3 mounted over the catheter shaft of FIG. 1;

FIG. 5 is an elevational view, with parts sectioned for clarity of illustration, of the catheter shaft and sleeve of the previous figures after an overdipping operation has been performed; and FIG. 6 shows the same assembly as FIG. 5 with the fully formed balloon thereof inflated by air pressure, and the drainage eye cut through the wall of the catheter shaft.

DESCRIPTION OF THE INVENTION

The manufacturing method described herein begins with the formation of a plastic catheter shaft 10. The formation of such catheter shafts is now conventional in the art, and generally is done by extrusion of a polyvinyl chloride or polyurethane material to form the cylindrical tube 10 having a longitudinal internal partition 12 which divides the interior of the catheter shaft 10 into a drainage lumen 14 and an inflation lumen 16. The extrusion process of course produces a cylindrical configuration, after which the distal tip 18 of the catheter shaft 10 is rounded and closed off by means of a conventional heat process. An inflation eye 20 is then punched into the wall of the catheter shaft 10 nearer the distal end of the catheter, which eye communicates with the inflation lumen 16. This step must be done before the plastic inflation sac is formed, since the inflation eye 20 must ultimately be within the inflation sac.

As an optional final step in the preparation of the catheter shaft 10, it may be provided with a coating of release agent 22 circumferentially about the catheter shaft 10 in the neighborhood of the inflation eye 20 and for some distance above and below the eye. The purpose of such coating is to provide good separation between the catheter shaft 10 and the plastic balloon which is formed thereover at a later stage of the manufacturing process, but for reasons which will later appear, it is not absolutely necessary to apply the coating 22 at the present stage.

The next step in the manufacturing process is to put a similar coating of release agent 22 over the end of a cylindrical mandrel 24, so that the plastic sleeve which is ultimately to form the inflation sac can be pre-formed upon the mandrel 24 and later easily removed therefrom.

Whether employed only upon the mandrel 24, or also upon the plastic catheter shaft 10, the release agent coating 22 is preferably a material such as Baymal, a colloidal hydrated alumina material available under that trademark from the Du Pont Company. It is a free-flowing white powder, the ultimate particles of which are submicroscopic fibrils of boehmite (A100H) approximately 0.5 millimicron in diameter and 100 to 150 millimicrons long. An acceptable alternative is a sub-microscopic particulate silica available from Godfrey L. Cabot, Inc. under the trademark Cabosil.

The plastic sleeve 26 is pre-formed upon the coated end of the mandrel 24 by dipping the end of the mandrel repeatedly into a solution of plastic material, preferably B F. Goodrich Co.'s Estane brand of high molecular weight cross-linked polyurethane material. Several different grades, such as Estane 5740 x 101 (a moderately high modulus polyester type polyurethane), Estane 5702 (a low modulus polyester type polyurethane), blends of these two, and Estane 5740 x 140 (a moderately high modulus polyether type thermoplastic polyurethane) were all tried successfully. Some polyester resins available from R. C. Division of Hooker Chemical Corp. have similar properties and are also acceptable. If polyurethane material is used, the solvent employed in the dip solution for the sleeve 26 may be tetrahydrofuran (THF). Subsequently, the wet film of plastic which the dipping operation forms over the coated end of the mandrel 24 is allowed to dry to a solid film about 4 to 6 thousandths of an inch thick, and the "cup" of plastic material 26 which results is then stripped from the mandrel 24 and the "bottom" 26a of the cup is trimmed off to form the cylindrical sleeve 26 as seen in FIG. 3.

In the operation just described, the release agent coating 22 between the mandrel 24 and the plastic cup or sleeve 26 serves to permit easy stripping from the mandrel 24. But even more importantly, the release agent coating 22 serves an additional function by virtue of the fact that it remains upon the inside surface of the sleeve 26 (see FIG. 3) after the latter is stripped from the mandrel 24.

Subsequently, as illustrated in FIG. 4, the sleeve 26 is slipped over the plastic catheter shaft 10 and surrounds the shaft in the neighborhood of the inflation eye 20.

When this is done, the plastic sleeve 26 and the catheter shaft 10 are then separated by a thin film of release agent 22, which consists at least partly of the remaining release agent upon the inner wall of the sleeve 26, and may also consist in part of the release agent initially coated upon the catheter shaft 10 as shown in FIG. 1, if that optional step is employed. In either case, the key function of the release agent coating 22 which separates the sleeve 26 from shaft 10 in FIG. 4 is to prevent sticking of the sleeve 26 to the shaft 10 during the subsequent steps in the formation of an inflation balloon from the sleeve 26.

The inflation balloon is formed by dipping the assembly of the shaft 10, the release agent coating 22, and the plastic sleeve 26 thereover, three or four times into a balloon-forming plastic dip solution preferably consisting of one of the above-mentioned Estane polyurethane plastic formulations dissolved in a mixture of 2 to 3 parts by weight of THF solvent to 1 part by weight of toluene non-solvent diluent, the solids in the solution constituting from about 12% to about 15% by weight. The dipping step produces a wet film over the sleeve 26 and over the catheter shaft 10 above and below the sleeve 26, which film dries to a solid plastic skin 28 extending from a point above the sleeve 26 down over the sleeve 26 and the entire tip of the catheter shaft 10. The skin 28 either becomes substantially integral with, or adheres strongly to, the plastic catheter shaft 10 both above the sleeve 26 and below it. The sleeve 26 also becomes substantially integral with or strongly adherent to the sleeve 26, so that elements 26 and 28 together form an inflatable sac or balloon over the catheter shaft 10 in the region of the inflation eye 20. This inflatable balloon, the interior wall of which was the plastic sleeve 26, is easily separable from the outer surface of the catheter shaft 10 because of the thin coating of release agent 22 which separates the sleeve from the catheter shaft, even after the overdipping step has been performed and the inflation balloon 26, 28 has dried in place upon the catheter shaft 10. Thus, when air is later introduced through the inflation lumen 16 and inflation eye 20, as indicated by arrow 30 in FIG. 6, the balloon 26, 28 separates easily from the catheter shaft 10 in the region covered by the release agent coating 22, to distend as shown.

This brings out an important advantage of the present invention. Once the manufacturing process just described has been completed, i.e., when the overdipped skin 28 has dried to form an inflatable balloon together with the sleeve 26, a test can then be immediately performed for quality control purposes. Specifically, air under pressure can be forced in through the inflation lumen 16 and the inflation eye 20 to distend the newly formed balloon or sac 26, 28 as shown in FIG. 6. If the manufacturing process has been successful and the balloon 26, 28 has been properly formed, the visible evidence will be the proper distention of the balloon when this test is performed. Contrast this, for example, with a plastic catheter wherein the balloon is separated from the catheter shaft by a water soluble partition, thus necessitating the introduction of water to the catheter before the catheter can be air tested.

A final step in the manufacture of the catheter is to punch or cut a drainage eye 32 through the plastic skin 28 and the wall of the plastic catheter shaft 10 to communicate with the drainage lumen 14 below the balloon area so that the catheter when in place can perform its drainage function.

The composition of the balloon-forming plastic dip solution is of critical importance in the practice of specific aspects of this invention. It is essential that the solvents be chosen for their ability to attack the plastic material of the catheter shaft 10 and sleeve 26 in order that sufficient bonding or adhesion of the skin 28 to the shaft and sleeve may be achieved. In addition, the liquid constituents of the solution must be highly volatile, so that the wet film deposited over the catheter shaft and sleeve will dry promptly to form the skin 28. But the solvent must not redissolve the sleeve 26 and thereby penetrate it to reach the release agent coating 22 and the underlying portion of the catheter shaft 10. If this were to happen, the material of the sleeve 26 and the adjacent surface of the catheter shaft 10 would adhere to each other after the liquid constituents had evaporated, causing stocking of the sac 26, 28 to the catheter shaft 10. This would prevent the formation of a free balloon, and prevent subsequent inflation for urethral retention. Accordingly, the solvent must be mixed with sufficient nonsolvent diluent material to limit penetration of the sleeve 26 during the overdipping process. However, the diluent materials must be carefully chosen so as not to limit the volatility of the liquid constituents, because the latter must evaporate before the sleeve 26 is dissolved and penetrated for the reasons aforesaid.

Because the sleeve 26 is preferably relatively thin, it is easily penetrated; yet the sleeve cannot be made relatively thick because to do so would make it unduly difficult to subsequently inflate the sac. If the plastic solution were made with 100% THF solvent, the resulting strong solvating effect would have a tendency to dissolve the sleeve 26 and thus penetrate therethrough to reach the underlying surface of the plastic catheter shaft 10. This would cause the dissolved material of the sleeve 26 to adhere to the catheter shaft 10 and thereby result in an imperfect or uninflatable balloon. However, there must be enough THF solvent to keep the polyurethane material in solution. Therefore, the rate of redissolving and penetration of the sac sleeve 26 is retarded by the use of the non-solvent diluent in the overdipping solution. The preferred diluent material is toluene. By mixing toluene and THF in the correct proportions, it has been found that the plastic skin 28 adheres to the catheter shaft 10 and to the sleeve 26, but does not penetrate the sleeve 26 to reach the underlying portion of the catheter shaft 10. As a result, the sleeve 26 is incorporated into the inflation balloon but remains free of the underlying surface of the catheter shaft 10 so that inflation is not impeded.

Considerable study has been given to the choice of materials and proportions for the balloon-forming plastic dip solution. The choice of THF as the polyurethane solvent is important because of its relatively high volatility, and the Estane plastic material is selected for its ability to dissolve in such a volatile material. The following is a table which compares the boiling point and evaporation time of THF with five other polyurethane solvents:

| Solvent | Boiling point, °C. | Evaporation time compared to ether as 1 |
|---|---|---|
| THF (tetrahydrofuran) | 66 | 2.0 |
| 1,4-dioxane | 101 | 5.8 |
| DMF (dimethyl formamide) | 153 | >20 |
| DMSO (dimethyl sulfoxide) | 189 | >20 |
| Pyridiene | 115 | 8.2 |
| N-methyl-2-pyrrolidone | 202 | >20 |

All the solvents listed above except THF fail to give the desired film formation over the plastic balloon sleeve 26 because of their lower volatility. Their evaporation rate is so slow that through sheer passage of time in contact with the solvent material, the sleeve 26 would tend to dissolve and be penetrated by the solvent, thereby causing adhesion of the sac sleeve 26 to the underlying surface of the plastic catheter shaft 10, even in the presence of suitable diluents.

The relative proportions of the solvent and diluent materials are critical, as well as the choice of solvent material. The minimum amount of diluent is considered to be approximately 20% by weight of the total solvent material. The maximum proportion of diluent depends upon the exact concentration of plastic solids in the solution. The range of solid constituents is from 12 to 15% by weight of the entire solution; a total solid content in the lower end of that range would allow for higher proportions of non-solvent diluent, and vice versa. In any event, however, the non-solvent diluent material should not exceed about 35% by weight of the solvent material.

The choice of diluent materials is fairly wide; toluene, methylene chloride, methyl ethyl ketone (MEK), and ethanol all are acceptable. A table of their boiling points and comparative volatilities is set out below:

| Non-solvent diluents | Boiling point, °C. | Evaporation time Compared with ether as 1 |
|---|---|---|
| Toluene | 111 | 4.5 |
| Methylene chloride | 40 | 1.8 |
| Methyl ethyl ketone (MEK) | 80 | 2.7 |
| Ethanol | 78 | 7.0 |

Blends of these diluents have also been found to be satisfactory for the present purpose. However, the preferred diluent material is toluene and the preferred proportions are 2 to 3 parts by weight of THF solvent to one part by weight of toluene non-solvent diluent.

For economy reasons, the solvent portion of the solution can be a maximum of about 5% of some of the less volatile polyurethane solvents, such as 1,4-dioxane, DMF, DMSO, pyridiene, and N-methyl-2-pyrrolidone. Such small proportions of lower volatility solvents can be tolerated without producing unsatisfactory results, but appreciably higher amounts than this, particularly where the lower volatility solvents of the group are concerned, has been found to give completely unsatisfactory results, even if a very volatile diluent such as MEK or methylene chloride is used therewith.

The exact choice of solid concentration depends upon the solution viscosity desired, which in turn depends upon the ambient temperature. At normal room temperatures, solid concentrations in excess of 15% would tend to produce too great a solution viscosity for good dipping results.

Accordingly, when a solution of solid material according to these preferred proportions is employed in the present process, the dipping and drying steps can be conducted at normal room temperature, without the need for the application of heat in order to lower the solution viscosity so that the proper coating thickness is achieving during the dipping operation. In addition, the application of heat to speed up the drying of the liquid constituents is not necessary. In fact, it has been found that if attempts are made to achieve similar results by the use of lower volatility solvents and the application of heat to speed up the evaporation process, the results are unsatisfactory. Accordingly, the present choice of solvent materials and proportions and the conduct of the present process at room temperature gives the best results and also does so under the most convenient conditions.

It will now be appreciated that the present process provides a simple, convenient and economical way to manufacture and test an inflatable balloon type urethral retention catheter, and gives excellent assurance that the inflatable balloon sac will not adhere to the underlying surface of the catheter shaft.

Since the foregoing description and drawings are merely illustrative, the scope of protection of the invention has been more broadly stated in the following claims, and these should be liberally interpreted so as to obtain the benefit of all equivalents to which the invention is fairly entitled.

What is claimed is:

1. The method of securing an inflatable sac to a plastic catheter having drainage and inflating lumens extending longitudinally therethrough and having an inflation eye extending through the wall of said shaft in communication with the inflating lumen, said method comprising the following steps:
    (a) coating an elongated cylindrical dipping form having a diameter substantially equal to the outer diameter of the catheter shaft with a release agent;
    (b) dipping said form into a thermoplastic solution to form a cylindrical sleeve having the aforesaid release agent on its inside surface,
    (c) sliding said sleeve over said shaft so that it covers said inflation eye,
    (d) overdipping said shaft and sleeve in a solution comprising approximately 12–15% by weight thermoplastic, approximately 50–68% by weight of a high volatile solvent, and approximately 20–35% by weight of a non-solvent diluent to form a skin united to the shaft and the inflatable sleeve by the solvent attacking the plastic material of the shaft and sleeve to form a bond or adhesion thereto,
    (e) and then drying at normal room temperatures.

2. The method of claim 1 further characterized in that step (b) comprises a plurality of dips until said sleeve assumes a thickness of 4 to 6 mils.

3. The method of claim 1 further characterized in that said thermoplastic material referred to in step (d) is a ployurethane; said solvent is tetrahydrofuran and said diluent comprises one of the group consisting of toluene, methylene chloride, methyl ethyl ketone, and ethanol.

4. The method of claim 1 further characterized in that said solvent has a maximum of 5% by weight of a relatively low volatile solvent mixed therein.

5. The method of claim 1 further characterized in that said release agent comprises one of the group consisting of a colloidal hydrated alumina material and a sub-microscopic particulate silica.

6. The method of claim 1 further characterized in that said thermoplastic solution referred to in step (b) comprises polyurethane and tetrahydrofuran.

References Cited

UNITED STATES PATENTS

| 2,043,630 | 6/1936 | Raiche | 264—264 |
| 2,230,151 | 1/1941 | Winder | 264—301 XR |
| 2,314,262 | 3/1943 | Winder | 264—294 XR |
| 2,330,400 | 9/1943 | Winder | 264—294 XR |
| 2,373,529 | 4/1945 | Beal | 264—130 XR |
| 2,390,070 | 12/1945 | Auzin | 264—250 XR |
| 3,304,353 | 2/1967 | Harautuneian | 264—296 XR |

ROBERT F. WHITE, Primary Examiner

R. R. KUCIA, Assistant Examiner

U.S. Cl. X.R.

264—242, 263, 264, 294, 306